(12) United States Patent
Chen et al.

(10) Patent No.: US 8,363,394 B2
(45) Date of Patent: Jan. 29, 2013

(54) EXPANSION CARD MODULE

(75) Inventors: Xiao-Zhu Chen, Shenzhen (CN); Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 12/827,002

(22) Filed: Jun. 30, 2010

(65) Prior Publication Data
US 2011/0255234 A1    Oct. 20, 2011

(30) Foreign Application Priority Data
Apr. 16, 2010   (CN) .......................... 2010 1 0148821

(51) Int. Cl.
*G06F 1/16* (2006.01)
*H05K 5/00* (2006.01)
*H05K 7/00* (2006.01)

(52) U.S. Cl. ............ 361/679.33; 361/679.37; 361/679.4

(58) Field of Classification Search . 361/679.33–679.45
See application file for complete search history.

(56) References Cited

U.S. PATENT DOCUMENTS

| | | | | |
|---|---|---|---|---|
| 3,289,047 A * | 11/1966 | Pick | | 361/724 |
| 5,611,057 A * | 3/1997 | Pecone et al. | | 710/301 |
| 5,708,563 A * | 1/1998 | Cranston et al. | | 361/679.6 |
| 5,820,171 A * | 10/1998 | Albani et al. | | 292/17 |
| 5,870,027 A * | 2/1999 | Ho | | 340/693.5 |
| 5,947,571 A * | 9/1999 | Ho | | 312/265.6 |
| 6,049,449 A * | 4/2000 | Cranston et al. | | 361/679.58 |
| 6,105,090 A * | 8/2000 | Fosmo | | 710/302 |
| 6,216,184 B1 * | 4/2001 | Fackenthall et al. | | 710/301 |
| 6,389,499 B1 * | 5/2002 | Frank et al. | | 710/300 |
| 6,967,837 B2 * | 11/2005 | Shih | | 361/679.48 |
| 7,057,903 B2 * | 6/2006 | Kuo | | 361/801 |
| 7,293,998 B2 * | 11/2007 | Nagashima | | 439/76.1 |
| 7,433,198 B2 * | 10/2008 | Fan et al. | | 361/752 |
| 7,940,491 B2 * | 5/2011 | Szeremeta et al. | | 360/99.23 |
| 8,004,791 B2 * | 8/2011 | Szeremeta et al. | | 360/97.21 |
| 8,107,256 B1 * | 1/2012 | Kondrat et al. | | 361/796 |
| 2002/0039286 A1 * | 4/2002 | Frank et al. | | 361/818 |
| 2002/0080541 A1 * | 6/2002 | Bunker et al. | | 361/72 |
| 2004/0032711 A1 * | 2/2004 | Kaczeus et al. | | 361/685 |
| 2005/0013112 A1 * | 1/2005 | Lin | | 361/686 |
| 2005/0018388 A1 * | 1/2005 | Shih | | 361/679 |
| 2005/0083667 A1 * | 4/2005 | Lai et al. | | 361/797 |
| 2005/0117288 A1 * | 6/2005 | Spychalla | | 361/685 |
| 2005/0122703 A1 * | 6/2005 | Fan et al. | | 361/801 |
| 2006/0050477 A1 * | 3/2006 | Wu et al. | | 361/684 |
| 2006/0065721 A1 * | 3/2006 | Addison et al. | | 235/383 |
| 2007/0053169 A1 * | 3/2007 | Carlson et al. | | 361/727 |
| 2007/0177346 A1 * | 8/2007 | Adachi | | 361/685 |
| 2008/0055876 A1 * | 3/2008 | Fan et al. | | 361/801 |
| 2008/0061661 A1 * | 3/2008 | Lin et al. | | 312/223.2 |
| 2008/0144272 A1 * | 6/2008 | Liang | | 361/685 |
| 2008/0218959 A1 * | 9/2008 | Wu et al. | | 361/685 |
| 2008/0225494 A1 * | 9/2008 | Yang | | 361/727 |

(Continued)

*Primary Examiner* — Adrian S Wilson
(74) *Attorney, Agent, or Firm* — Altis Law Group, Inc.

(57) ABSTRACT

An expansion card module includes an expansion card, an adapter card electrically coupled to the expansion card, and a box enclosing the expansion card and the adapter card. The expansion card includes a fixing plate fixed to the box. The adapter card includes a connector to be electrically coupled to a motherboard of the computer by a cable. A mounting bracket for a storage device is not occupied by the storage device, but receives the box of the expansion card module therein.

6 Claims, 5 Drawing Sheets

U.S. PATENT DOCUMENTS

| | | |
|---|---|---|
| 2008/0253076 A1* | 10/2008 | Chen .............................. 361/684 |
| 2008/0293265 A1* | 11/2008 | Nguyen et al. .................. 439/74 |
| 2008/0298014 A1* | 12/2008 | Franco .......................... 361/688 |
| 2009/0067142 A1* | 3/2009 | Tsai et al. ..................... 361/759 |
| 2009/0073666 A1* | 3/2009 | Tsai et al. ..................... 361/740 |
| 2009/0097200 A1* | 4/2009 | Sharma et al. ................. 361/688 |
| 2009/0146030 A1* | 6/2009 | Chen et al. ................. 248/213.2 |
| 2009/0164685 A1* | 6/2009 | Chen et al. ..................... 710/301 |
| 2009/0167124 A1* | 7/2009 | Lee et al. .................. 312/223.2 |
| 2010/0205454 A1* | 8/2010 | Wu et al. ....................... 713/189 |

* cited by examiner

EXPANSION CARD MODULE

BACKGROUND

1. Technical Field

The present disclosure relates to an expansion card module for a computer.

2. Description of the Related Art

A computer is equipped with expansion cards to improve the properties or expand applications of the computer. Traditionally, the expansion cards are directly inserted into corresponding expansion card slots. Therefore, a space for the expansion cards must be reserved in the computer chassis. However, it is difficult to reserve a space large enough for mounting expansion cards in a mini computer chassis.

DETAILED DESCRIPTION

Figure 1:
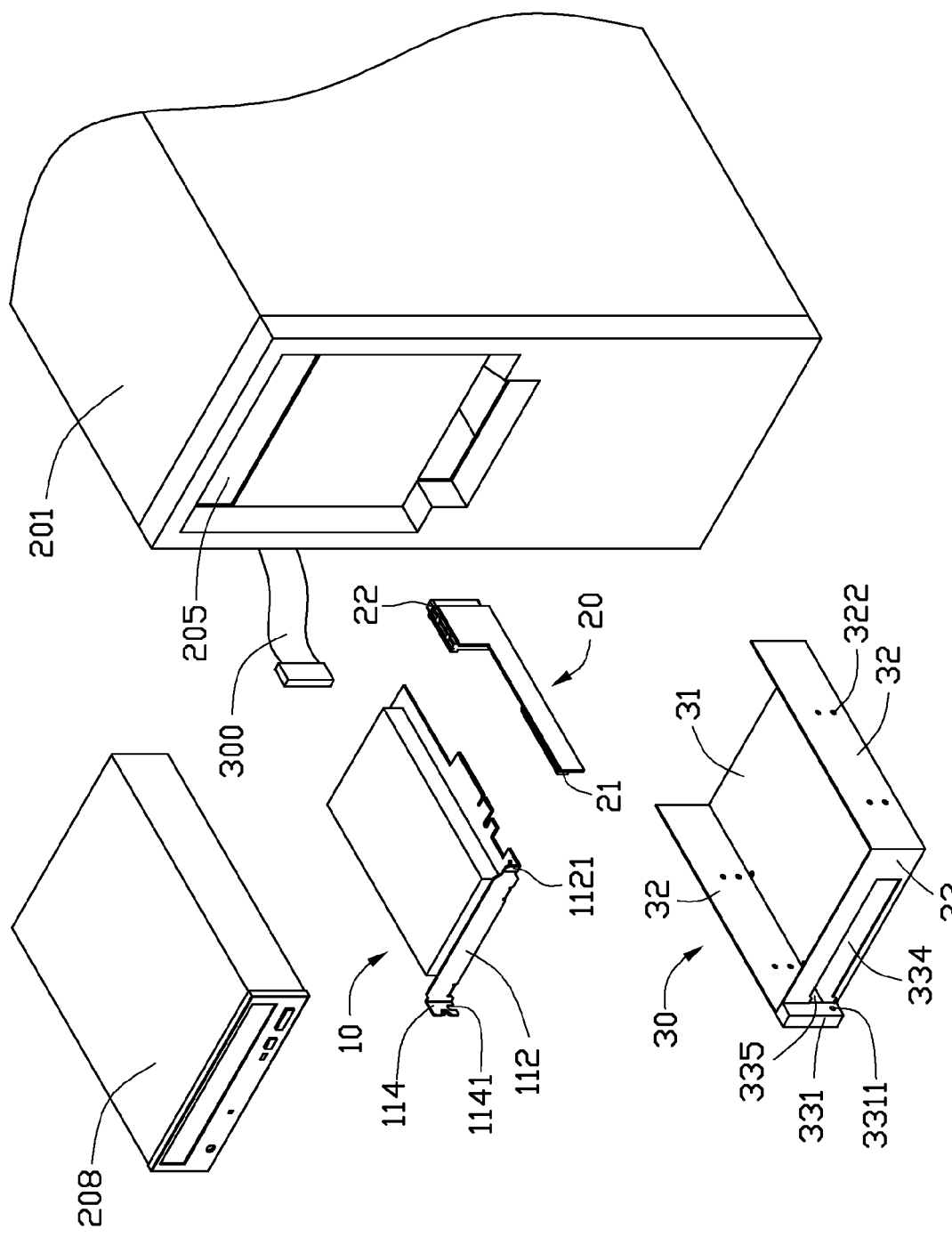
FIGS. 1 and 2 are exploded, isometric views of an embodiment of an expansion card module, a computer, a storage device, and a cable, but shown in different perspectives.
Figure 2:
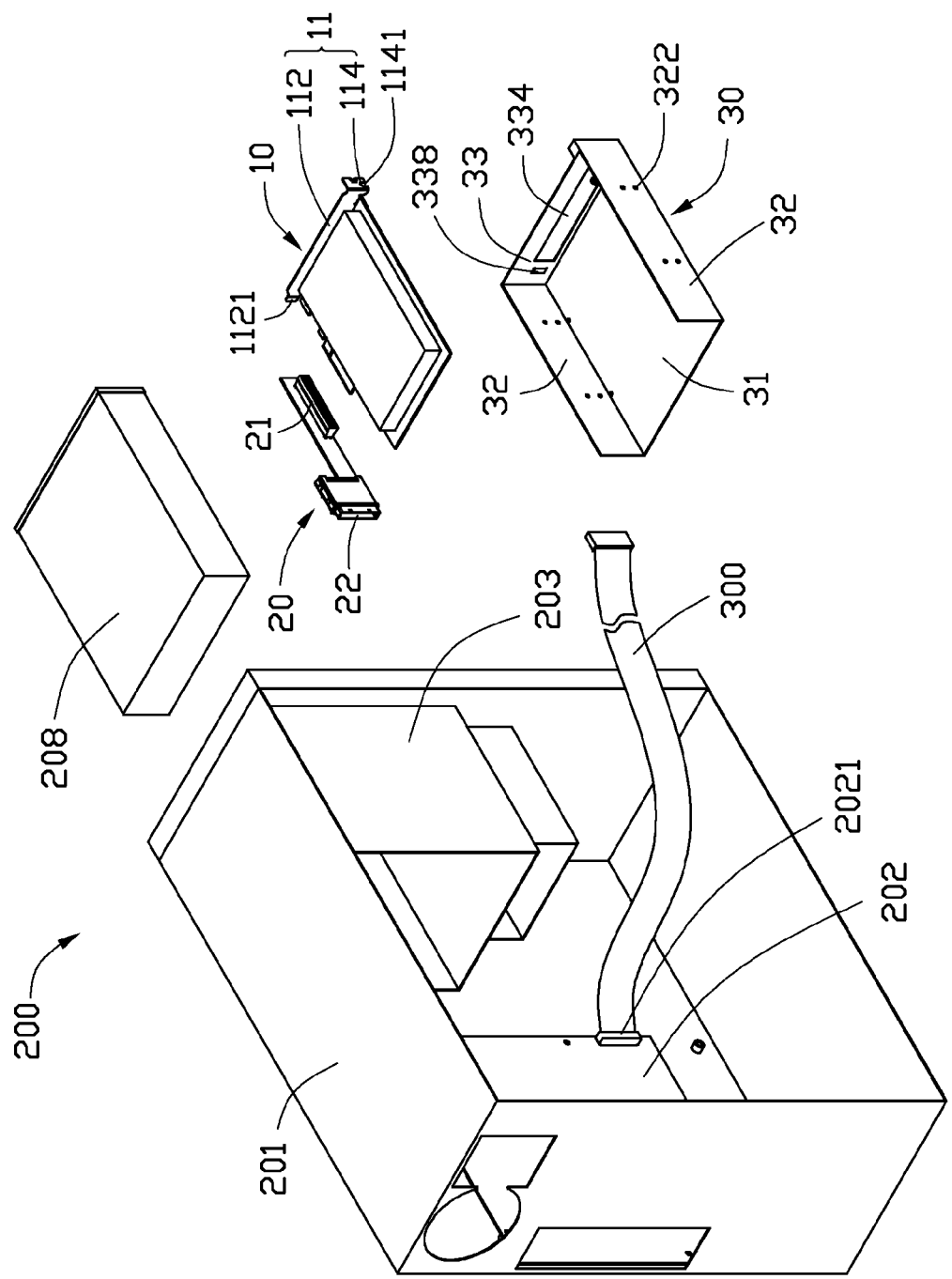

Referring to FIGS. 1 and 2, an embodiment of an expansion card module is installed in a computer 200, and includes an expansion card 10, an adapter card 20, and a box 30.

The computer 200 includes a chassis 201, a motherboard 202, and a mounting bracket 203 adapted for receiving a storage device 208. In one embodiment, the storage device 208 is an optical disk drive. The motherboard 202 includes a first connector 2021. In one embodiment, the first connector 2021 is a mini serial attached small computer system interface (SAS) connector. An opening 205 communicating with an inner surface of the mounting bracket 203 is defined in the front side of the chassis 201.

In one embodiment, the expansion card 10 is a peripheral component interconnection (PCI) or PCI-express card. A fixing plate 11 is mounted to an end of the expansion card 10. The fixing plate 11 is L-shaped and includes a blocking portion 112 with a tapered tongue 1121 formed at a first end of the blocking portion 112, and a retaining portion 114 perpendicularly extending from a second end of the blocking portion 112 opposite to the tapered tongue 1121. The retaining portion 114 defines a retaining hole 1141.

An expansion card connector 21 is disposed on a side of the adapter card 20 for engaging the expansion card 10. A second connector 22 is disposed on an end of the adapter card 20. In one embodiment, the expansion card connector 21 is a PCI or PCI-express connector, and the second connector 22 is a Mini SAS connector.

The box 30 includes a bottom plate 31, two sidewalls 32 perpendicularly extending up from opposite sides of the bottom plate 31, and an end plate 33 perpendicularly extending up from a front end of the bottom plate 31. The box 30 is shaped like the storage device 208. Therefore, the box 30 is able to slide into the mounting bracket 203 through the opening 205. Each of the sidewalls 32 defines a plurality of screw holes 322. A fixing block 331 extends from an outside of the end plate 33, and is arranged at an end of the end plate 33. The fixing block 331 defines a screw hole 3311. A transverse slot 334 is defined in the end plate 33. The fixing block 331 adjoins a first end of the transverse slot 334. A resilient locking tab 338 is attached to an inner side of the end plate 33, adjacent to a second end of the transverse slot 334 far away from the fixing block 331. A bottom of the locking tab 338 is fixed to the end plate 33. A top of the locking tab 338 is movable related to the end plate 33, and tends to resist against the end plate 33 under elastic force of the locking tab 338.

Figure 3:
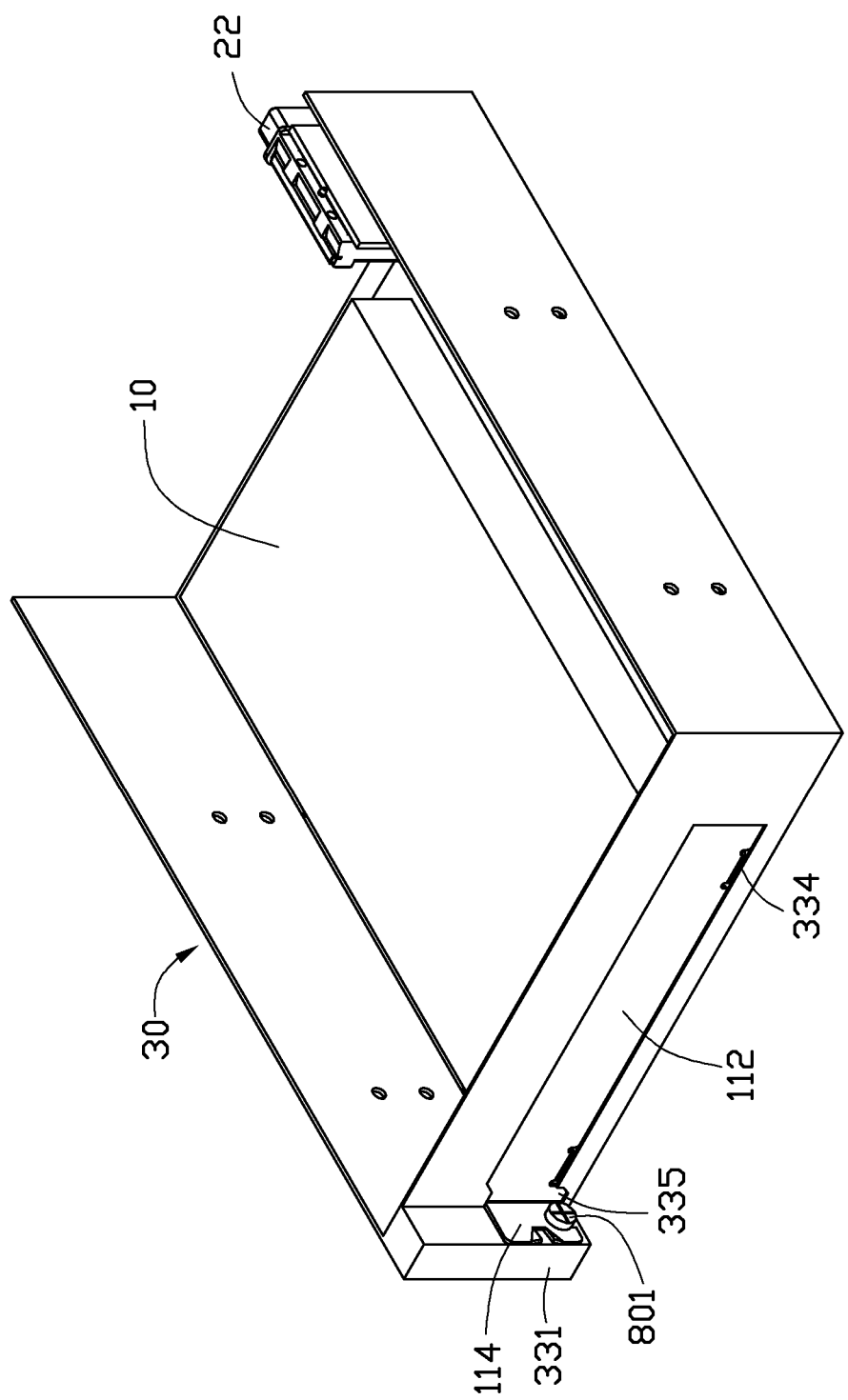
FIG. 3 is an assembled, isometric view of the expansion card module of FIG. 1.
Figure 4:
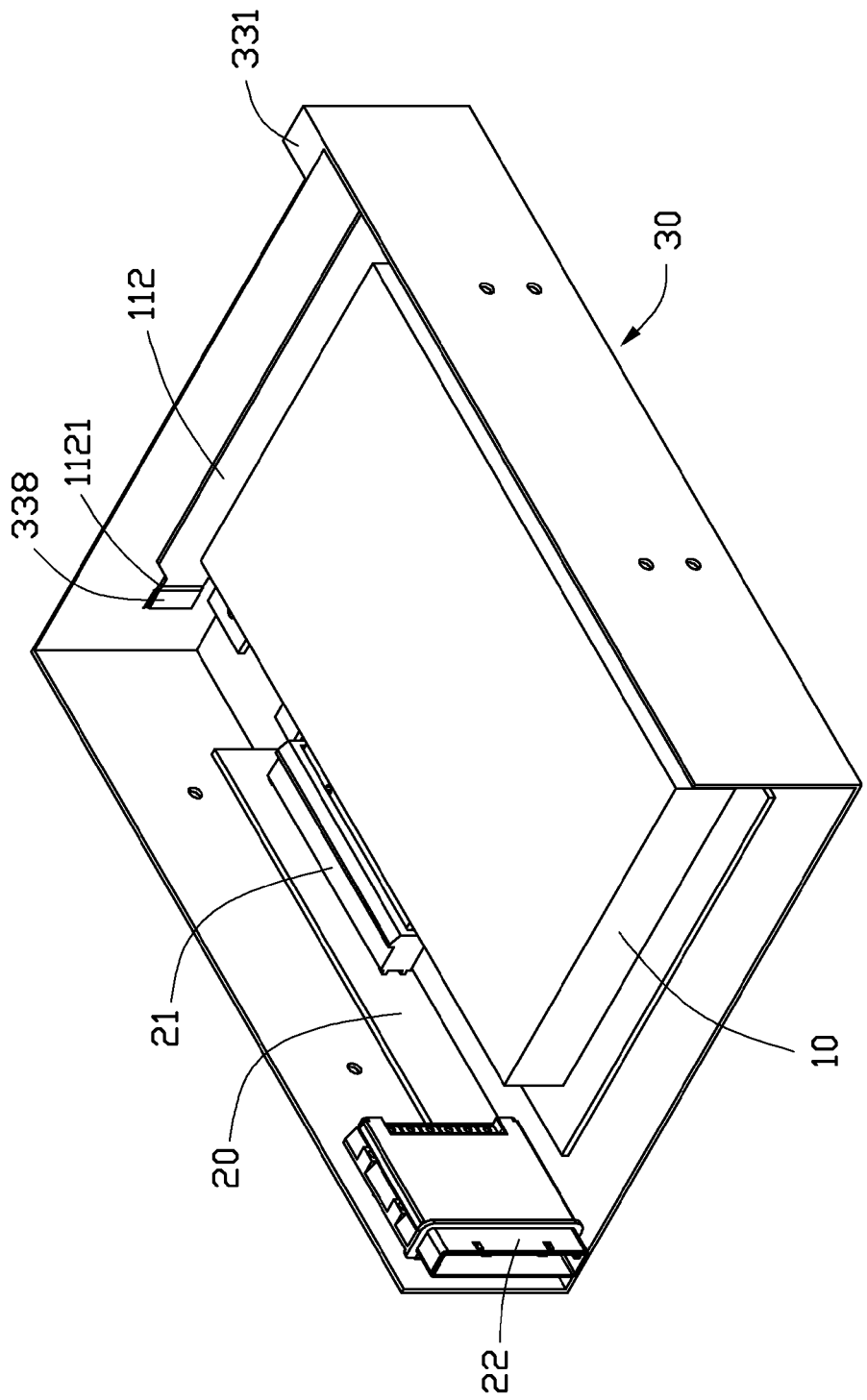
FIG. 4 is an assembled, isometric view of the expansion card module of FIG. 2.

Referring to FIGS. 3 and 4, in assembly, the expansion card 10 is engaged with the expansion card connector 21 of the adapter card 10. The expansion card 10 and the adapter card 20 are received in the box 30, with the tapered tongue 1121 of the fixing plate 11 engaged between the locking tab 338 and the end plate 33 from the top of the fixing tab 338. The locking tab 338 restores to make the top of the locking tab 338 resist against the end plate 33 to prevent the tapered tongue 1121 from disengaging from the locking tab 338. The retaining portion 114 extends out of the box through the transverse slot 335, and abuts against the fixing block 331. The expansion card 10 is manipulated, to make the blocking portion 112 align with the transverse slot 334, and the retaining hole 1141 align with the screw hole 3311. A screw 801 extends through the retaining hole 1141 and is engaged in the screw hole 3311, to secure the expansion card 10 to the box 30.

Figure 5:
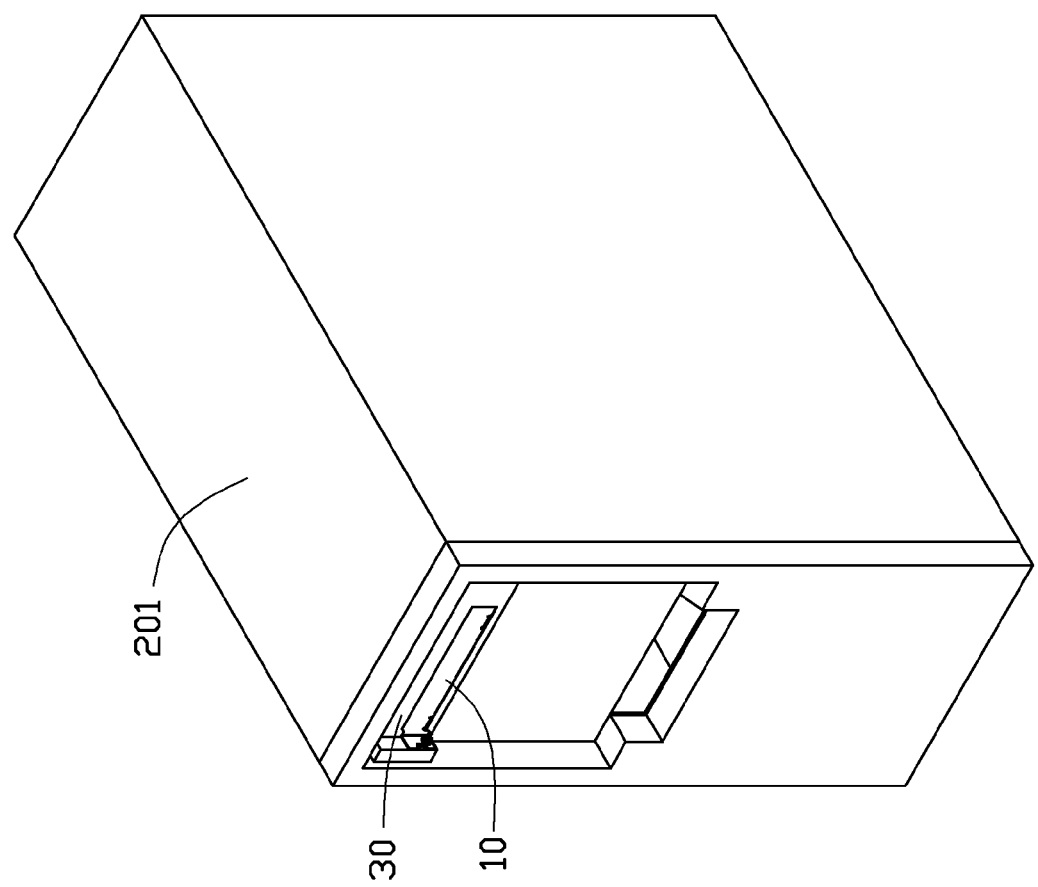
FIG. 5 is an assembled, isometric view of the expansion card module and the computer of FIG. 1.

Referring to FIG. 5, to mount the expansion card 10 to the computer 200 with the storage device 208 absent from the mounting bracket 203, the box 30 is slid into the mounting bracket 203 through the opening 205 of the chassis 201. The box 30 is secured to the mounting bracket 203 with a plurality of screws (not shown) extended through the side plate (not labeled) of the mounting bracket 203 and correspondingly engaged in the screw holes 322 of the box 30. The expansion card 10 is electrically connected to the motherboard 202 with a cable 300 couple to the first connector 2021 of the motherboard 202 and the second connector 22 of the adapter card 20.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. An expansion card module mounted to a computer, the computer comprising a motherboard and a mounting bracket adapted for receiving a storage device, the expansion card module comprising:

a box received in the mounting bracket of the computer and shaped like the storage device;

an expansion card received in the box, and comprising a fixing plate fixed to the box; and an adapter card received in the box, and electrically connected to the motherboard and the expansion card;

wherein the box comprises a bottom plate, and two sidewalls perpendicularly extending up from opposite sides of the bottom plate, each of the sidewalls of the box defines a plurality of screw holes to engage with a plurality of screws used for fixing the box to the mounting bracket of the computer;

wherein the box further comprises an end plate perpendicularly extending up from a front end of the bottom plate, a fixing block and a locking tab are respectively attached to the end plate, opposite ends of the fixing plate of the expansion card are correspondingly fixed to the fixing block and the locking tab;

wherein the fixing plate is L-shaped and comprises a blocking portion with a tapered tongue formed at a first end of the blocking portion, and a retaining portion perpendicularly extending from a second end of the blocking portion opposite to the tapered tongue, the retaining portion is fixed to the fixing block of the box with a screw, the tapered tongue is engaged between the locking tab and the end plate of the box; and wherein a bottom of the locking tab is fixed to the end plate, a top of the locking tab is movable related to the end plate, and tends to resist against the end plate under elasticity of the locking tab, to prevent the tapered tongue of the fixing plate from disengaging from the locking tab.

2. The expansion card module of claim 1, wherein the fixing block and the locking tab are respectively disposed on an outside and an inner side of the end plate of the computer, the end plate defines a transverse slot between the fixing block and the locking tab, the blocking portion of the fixing plate abuts against the inner side of the end plate and is aligned with the transverse slot of the end plate, the retaining portion of the fixing plate extends out of the box through the transverse slot;

wherein a bottom of the locking tab is fixed to the end plate, a top of the locking tab is movable related to the end plate, and tends to resist against the end plate under elasticity of the locking tab, to prevent the tapered tongue of the fixing plate from disengaging from the locking tab.

3. The expansion card module of claim 1, wherein the adapter card comprises an expansion card connector, the expansion card is engaged with the expansion card connector of the adapter card.

4. The expansion card module of claim 3, wherein the expansion card is a peripheral component interconnection (PCI) or PCI-express card, the expansion card connector is a PCI or PCI-express connector.

5. The expansion card module of claim 1, wherein the adapter card comprises a connector, the adapter card is electrically connected to the motherboard of the computer with a cable coupled to the connector of the adapter card and the motherboard of the computer.

6. The expansion card module of claim 1, wherein the connector of the adapter card is a mini serial attached small computer system interface connector.

* * * * *